(No Model.)
E. H. ASHCROFT.
ELECTRICAL LOW WATER DETECTOR.
No. 265,364. Patented Oct. 3, 1882.
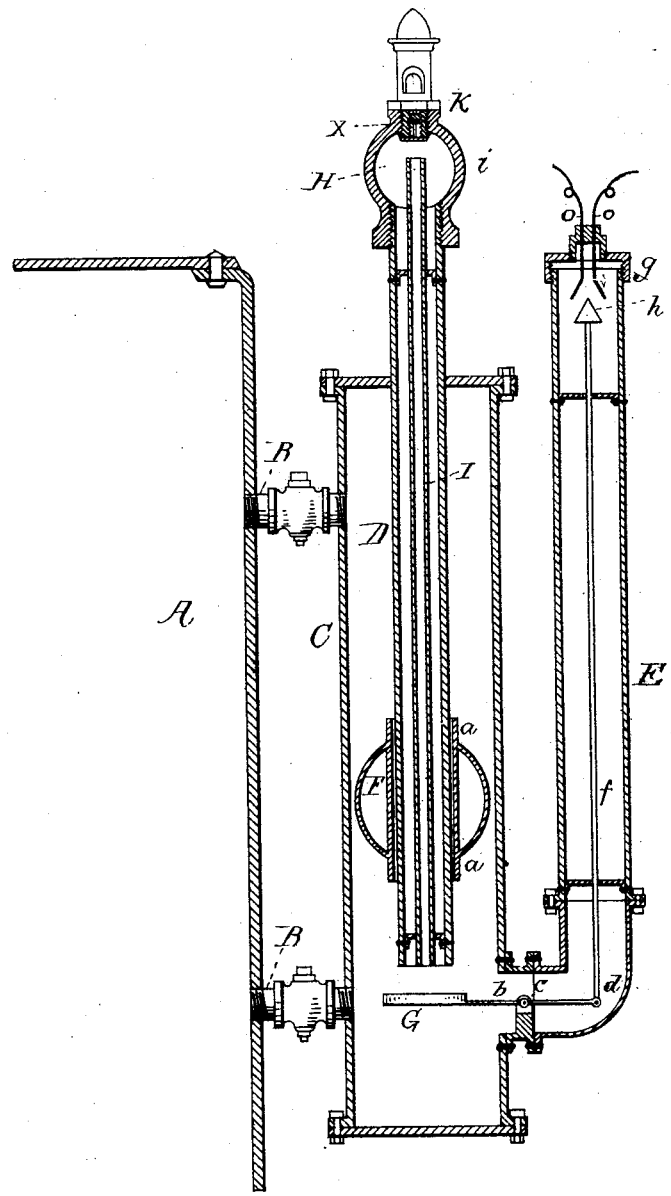
WITNESSES
Frank G. Parker
Chas. Spaulding.
INVENTOR
Edward H. Ashcroft

UNITED STATES PATENT OFFICE.

EDWARD H. ASHCROFT, OF LYNN, MASSACHUSETTS.

ELECTRICAL LOW-WATER DETECTOR.

SPECIFICATION forming part of Letters Patent No. 265,364, dated October 3, 1882.

Application filed June 2, 1882. (No model.)

*To all whom it may concern:*

Be it known that I, EDWARD H. ASHCROFT, of Lynn, in the county of Essex, in the Commonwealth of Massachusetts, a citizen of the United States, have invented a certain new and useful Improvement in Low-Water Detectors, of which the following is a full, clear, and exact description, reference being had to the accompanying drawing, forming a part of this specification, in explaining its nature and operation.

This invention relates to the class of low-water indicators and alarms for steam-boilers, and may be applied to liquid-reservoirs for the purpose of showing the level of the water or liquid in the vessel to which it may be applied. In this present case I prefer to show it attached to a steam-boiler.

The invention consists in the application of well-known principles; and in the adaptation in this case for steam-boilers the same consists in the combination of two concentrically-placed tubes or pipes, which are jointly capped at their upper ends by a cap-nut. Upon the outer pipe a float is provided, which may slide up or down on the same in accordance with a rising or falling level of the water or liquid which a cylindrical stand-pipe or drum, into which the two concentric pipes are fixed, contains. Near to the bottom of this stand-pipe an upright tubular arm is attached, which communicates therewith by means of its shorter elbow end. Near or at the junction of this elbow with the drum or stand-pipe, and in the inside of the horizontal end of the tube extending upward from out of the drum, pivot supports or bearings are fixed, upon which a lever is adjusted to balance parallel within and with the horizontal end of the upright tubular arm when not in action. One of the ends of this lever, which points away from the drum, has an upright rod or stem hinged to it, which same stem is balanced by the other end of the lever when in a normal condition; but, as the sliding float is allowed to settle down upon that free end of the lever, when the water falls to a certain level the end to which the pointed stem is connected will be raised up and will touch the two metallic ends or contact-points, which extend inward from the top of the upright tubular arm, from which they are insulated, as well as from each other. The two metallic contact-points are then caused to complete an electric circuit with a battery and an alarm or bell, which by sounding acts as the low-water detector. In connection with and in addition to the afore-described contrivance, there is an easily-fusible metallic plug or disk placed above the upper end of the inner concentric pipe, which same metallic plug will be melted at a time when the steam is allowed, by the low state of the water in the boiler and in the drum into which the two concentric tubes are inserted, to fill the whole space inside the detector device previously containing the water, and thereby give the alarm in giving vent to the steam to reach a steam-whistle.

Referring to the accompanying drawing, which represents a vertical section of my improved instrument attached to the end of a boiler, A is the boiler; B B, the connecting-pipes, with cocks, which support the apparatus, and through which the water and steam flow from the boiler to the stand-pipe C of said apparatus, as with an ordinary water-gage.

D is a pipe placed centrally within the vessel C, and extending nearly to the water-connection of the vessel C with the boiler, but terminating preferably above the tubes of the boiler.

F is a float easily fitting the outer circumference of pipe D, and adapted to slide up and down said pipe as the water rises and falls in the vessel C. The float of course has a tube through it, which easily fits the pipe D, as before described. The tube D must have an equal or isometric outside diameter in order to allow the float to slide on the same or to rise and fall easily without obstruction from the same.

Attached to the vessel C, and parallel therewith, I locate another pipe, E, which extends to the top of said vessel, although it is not essential how far up it may extend, provided that the top is above the water-line of the boiler.

Near the bottom of vessel C, I locate a platform, G, to balance the weight of the rod at the other end, which is supported by a lever or rod, $b$, fulcrumed at $c$ and extending to a point, $d$, where it connects with a vertical rod, $f$. These rods are located within the pipe E, as shown, and upon the extreme end of rod $f$ is secured a conical metal point, $h$, of copper or other good conductor of electricity.

On the top of pipe E, I place a screw-cap, $g$, which fits the pipe steam-tight, and through this cap I lead two electric conductors, $o\ o$, which of course should be properly insulated to prevent the escape of the electric currents. These conductors may be attached to one of the well-known batteries, and also to an alarm-bell or other signal, which may be placed in the office of the superintendent of the works in which the boiler is used, or at any desired point where, when the alarm sounds, it will be heard. The electric connections are so arranged that when the metal point $h$ is raised up in contact with the electric springs an electric current is formed with the wires and the battery and with the alarm device.

Within pipe D, I locate a smaller pipe, I, which extends to the bottom of pipe D, and above its top, on the upper end of pipe D, I secure a globe-shaped cap-nut, $i$, and on top of said chamber a whistle, K, is mounted. The lower part of the whistle incloses a fusible disk, X, which is made of metal designed to melt at a temperature of about 212° Fahrenheit. Pipes D and I are both open at the bottom to allow the water to flow into and through them into the chamber H. Pipe I is suspended within the pipe D with a thin web of metal. The object of locating small pipe I within pipe D is to obtain a rapid circulation and discharge of the water from the pipes D and I when the water in the boiler has fallen below the bottom of both pipes D and I, so that the steam may instantly enter chamber H and fuse the disk X and blow the whistle K.

The operation of the apparatus is as follows: The vessel C being properly attached to the boiler and the stop-cocks opened, steam and water from the boiler will flow into said vessel C through the respective cocks, and thereby a uniform level will be maintained in said vessel with that in the boiler. The steam on the surface of the water in the boiler will force the water up the pipes D and I as far as the disk of fusible metal X, which will prevent further escape. The distance of said disk of fusible metal X from the top of the vessel C is such that a free exposure of the pipe D and the chamber H to the atmosphere will reduce the temperature of the water contained therein to a degree insufficient to melt said disk; but as soon as the water-level in the boiler falls to or below the bottom of the tubes D and I the level of the water in said tubes will have simultaneously fallen and the water flowed out of the same subsequently, whereupon the steam will enter into the chamber H through said tubes and melt the fusible disk or plug, causing at the same time the whistle placed over the orifice to sound the alarm. In the other branch of the apparatus, when the float falls with the fall of water in the boiler its weight, resting upon the platform G, will tip said platform downward, and thus raise rod $f$, and thereby bring the metal point $h$ in contact with the electric springs connected with the electric battery, which will cause an alarm to be sounded, and thus give notice of low water in the boiler. Thus it will be seen that I have a simple and an effective low-water indicator and alarm, so that if one branch of the device should fail to operate the other will sound an alarm of danger.

Having described my invention, what I claim as new, and desire to secure by Letters Patent, is—

1. A low-water indicator and alarm consisting of the vessel C, central pipe, D, float F, weighted platform G, rods $b$ and $f$, the copper point $h$, and electric conductors, all operating together for the purpose set forth.

2. The combination, in a low-water indicator and alarm, of the vessel C, pipe D, float F, and pipe E with an electrical alarm mechanism, all arranged for joint operation in manner set forth.

In testimony that I claim the foregoing I have hereunto set my hand this 29th day of May, 1882.

EDWARD H. ASHCROFT.

Witnesses:
 FRANK G. PARKER,
 CHAS. SPAULDING.